(12) United States Patent
Zhou et al.

(10) Patent No.: US 11,926,452 B2
(45) Date of Patent: Mar. 12, 2024

(54) PACKAGING BOX

(71) Applicant: ShenZhen YUTO Packaging Technology Co., Ltd., Shenzhen (CN)

(72) Inventors: Xiaolong Zhou, Shenzhen (CN); Xiaobin Li, Shenzhen (CN)

(73) Assignee: SHENZHEN YUTO PACKAGING TECHNOLOGY CO., LTD., Guangdong (CN)

(*) Notice: Subject to any disclaimer, the term of this patent is extended or adjusted under 35 U.S.C. 154(b) by 91 days.

(21) Appl. No.: 17/564,140

(22) Filed: Dec. 28, 2021

(65) Prior Publication Data
US 2023/0128423 A1    Apr. 27, 2023

(30) Foreign Application Priority Data

Oct. 22, 2021 (CN) .......................... 202111236362.7

(51) Int. Cl.
| | |
|---|---|
| *B65D 5/42* | (2006.01) |
| *B31B 50/82* | (2017.01) |
| *B65D 5/50* | (2006.01) |
| *B65D 5/66* | (2006.01) |
| *B31B 120/10* | (2017.01) |

(52) U.S. Cl.
CPC ............ *B65D 5/425* (2013.01); *B31B 50/82* (2017.08); *B65D 5/5019* (2013.01); *B65D 5/66* (2013.01); *B31B 2120/102* (2017.08)

(58) Field of Classification Search
CPC ........ B65D 5/425; B65D 5/5019; B65D 5/66; B65D 5/5213; B65D 5/4204; B65D 5/5038; B65D 25/102; B65D 5/38

USPC ........ 229/116.5, 125.37, 164; 206/754, 250, 206/804

See application file for complete search history.

(56) References Cited

U.S. PATENT DOCUMENTS

| | | | | |
|---|---|---|---|---|
| 4,896,766 | A * | 1/1990 | Paley ................... | B65D 5/5213 206/754 |
| 5,096,055 | A * | 3/1992 | Opper .................. | B65D 5/5213 206/754 |
| 11,161,646 | B1 * | 11/2021 | Parrish ................. | B65D 5/541 |
| 11,414,247 | B1 * | 8/2022 | Philips ................. | B65D 43/24 |
| 11,439,964 | B2 * | 9/2022 | Sasso ................... | B65D 5/40 |
| 11,713,157 | B2 * | 8/2023 | Cernokus ............. | B65D 81/022 229/125.37 |
| 2014/0124395 | A1 * | 5/2014 | Nadeau ................ | B65D 5/5213 206/250 |

(Continued)

*Primary Examiner* — Christopher R Demeree
(74) *Attorney, Agent, or Firm* — Arch & Lake LLP

(57) ABSTRACT

A packaging box, including: a housing, including a cover body and a seat body, the seat body includes a first recessed portion and a second recessed portion, the cover body is reversibly connected to the seat body, so that the first recessed portion can be covered or exposed; a lifting mechanism, including a load-bearing member and a transmission part, and a reflector that is placed in the seat body and forms a 1 hollow space with the second recessed portion. The load-bearing member is placed in the first recessed portion and reversibly connected to the sidewall of the first recessed portion, the load-bearing member is used to carry items, and the transmission part is placed between the cover body and the load-bearing part so that the load-bearing part can be extended or retracted into the first recessed portion by the overturning of the cover body.

11 Claims, 5 Drawing Sheets

(56) References Cited

U.S. PATENT DOCUMENTS

2018/0022500 A1* 1/2018 Zhu .................... B65D 5/5014
  206/775
2023/0026698 A1* 1/2023 Zheng .................. B65D 81/05

* cited by examiner

PACKAGING BOX

CROSS-REFERENCE TO RELATED APPLICATION

The present application is based on and claims the priority to the Chinese Patent Application No. 202111236362.7, filed on Oct. 22, 2021, the entire content of which is hereby incorporated by reference for all purposes.

TECHNICAL FIELD

This application relates to the technical field of packaging containers, specifically, to a packaging box.

BACKGROUND

With the development of our society, people have higher expectations for quality of life. Nowadays, people's expectations for product packaging are not only whether it can protect the product or facilitate transportation, but also whether the product packaging is interesting, and whether the process of packaging an item is fun. When using the packaging boxes in prior arts to package and access items, the process is relatively uninteresting, and users thus has a poor experience in the process of packaging items.

SUMMARY

The present disclosure provides a packaging box for storing and accessing items in the packaging box, and a manufacturing method thereof.

According to a first aspect of the disclosure, the packaging box includes: a housing that includes a cover body and a seat body, the seat body includes a first recessed portion and a second recessed portion, and cover body is configured to adjust to cover or expose the first recessed portion by reversibly connecting to the seat body; a lifting mechanism that includes a load-bearing part and a transmission part; and a reflector placed in the seat body and forming a hollow space with the second recessed portion. The load-bearing part is placed in the first recessed portion and is reversibly connected to the sidewall of the first recessed portion, and the load-bearing part is used to carry items. The transmission part is connected between the cover body and the load-bearing part, so that the load-bearing part can extend or retract the first recessed portion by turning the cover body over.

According to a second aspect of the present disclosure, a method of manufacturing a packaging box is provided. The method includes: providing a housing comprising a cover body and a seat body, providing the seat body with a first recessed portion and a second recessed portion, and reversibly connecting the cover body to the seat body, so that the cover body is configured to adjust to cover or expose the first recessed portion; providing a lifting mechanism comprising a load-bearing part and a transmission part; and placing a reflector in the seat body, and forming a hollow space between the reflector and the second recessed portion.

It is to be understood that the foregoing general description and the following detailed description are exemplary and explanatory only and are not restrictive of the disclosure.

BRIEF DESCRIPTION OF THE DRAWINGS

The drawings herein are incorporated into the specification and constitute a part of the specification, show examples conforming to the disclosure, and together with the specification are used to explain the principle of the application. In order to more clearly illustrate the technical solutions of the examples of the present disclosure, the following paragraphs will briefly introduce the accompanying drawings used in the description of the examples.

DETAILED DESCRIPTION

Figure 1:
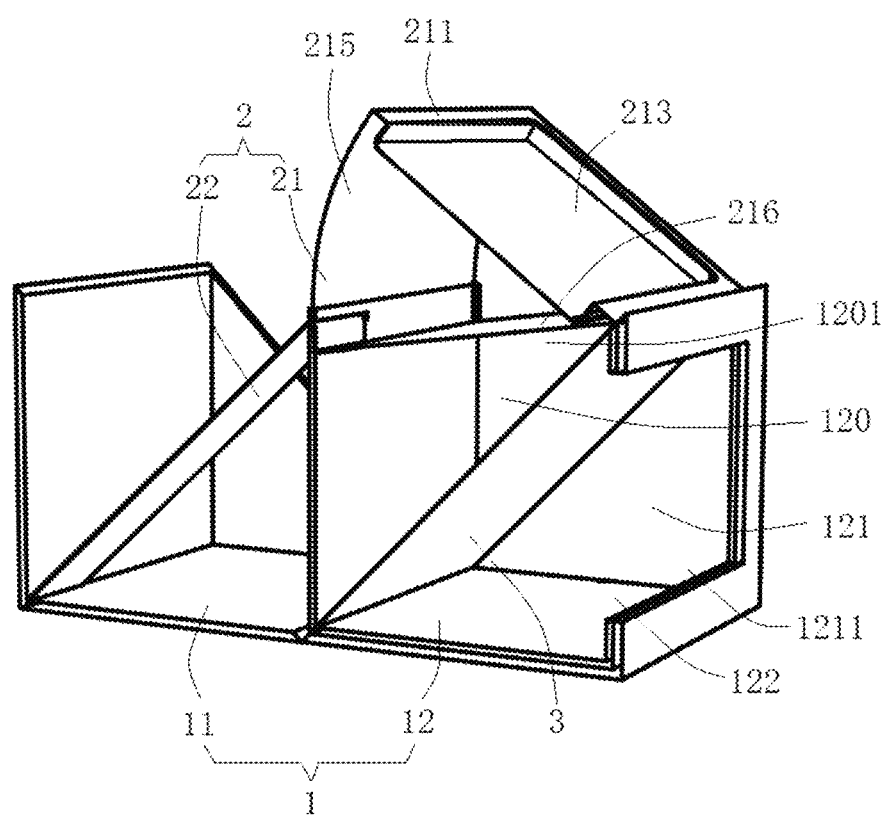
FIG. 1 is a cross-sectional schematic diagram of the packaging box in an open state according to one example of the disclosure.

The examples of this disclosure will be further described in conjunction with reference to the accompanying drawings. Through the above drawings, the specific examples of the present disclosure have been shown, which will be described in more detail later. These drawings and text descriptions are not intended to limit the scope of the concept of the present disclosure in any way, but to explain the concept of the present disclosure for those skilled in the art by referring to specific examples.

The examples of the present disclosure will be described in detail here, and examples thereof are shown in the accompanying drawings. When the following description refers to the drawings, unless otherwise indicated, the same numbers in different drawings indicate the same or similar elements. The implementation manners described in the following examples do not represent all implementation manners consistent with the present application. On the contrary, they are merely examples of devices and methods consistent with some aspects of the application as detailed in the appended claims.

It should be noted that in this article, the terms "include," "include" or any other variants thereof are intended to cover non-exclusive inclusion, so that a process, method, article or device including a series of elements not only includes those elements. It also includes other elements that are not explicitly listed, or elements inherent to the process, method, article, or device. Without more restrictions, the element defined by the sentence "including a . . . " does not exclude the existence of other same elements in the process, method, article or device that includes the element. In addition, the application is implemented differently. The parts, features, and elements with the same name in the examples may have the same meaning or different meanings, and their specific meanings need to be determined by their interpretation in the specific example or further combined with the context in the specific example.

It should be understood that although the terms first, second, etc. may be used herein to describe various information, the information should not be limited to these terms. These terms are only used to distinguish the same type of information from each other. For example, without departing from the scope of this document, the first information may also be referred to as second information, and similarly, the second information may also be referred to as first information. Depending on the context, as used herein, the term "if" may be construed as "at . . . when" or "when upon" or "in response to determining." Furthermore, as used herein, the singular forms "a", "an" and "the" are intended to also include the plural forms, unless the context dictates to the contrary. It should be further understood that the terms "comprising" and "including" indicate the presence of the described features, steps, operations, elements, components, items, types, and/or groups, but do not exclude one or more other features, steps, operations, The existence, appearance or addition of elements, components, items, categories, and/or groups. The terms "or" and "and/or" used herein are interpreted as inclusive or mean any one or any combination. Therefore, "U, V or W" or "U, V and/or W" means "any of the following: U; V; W; U and V; U and W; V and W; U, V and W." An exception to this definition will only occur when the combination of elements, functions, steps or operations is inherently mutually exclusive in some way.

It should be understood that the specific examples described here are only used to explain the present application, and are not used to limit the present application.

DESCRIPTION OF NUMERAL REFERENCES 1. the housing assembly;
11. the cover body; 111. the fifth sidewall; 112. the first side edge; 113. the second side edge; 114. the sixth sidewall; 115. the ninth sidewall; 116. the tenth sidewall;
12. the seat body;
120. the first recessed portion; 1201. the first opening; 121. the second recessed portion; 1211. the observation portion; 122. the bottom wall; 123. The first sidewall; 124, the second sidewall; 125. the third sidewall; 126. the fourth sidewall; 127. the seventh sidewall; 128. the eighth sidewall; 129. the inner sidewall;
13. the first rotational axis;
14. the second rotational axis;
2. the lifting mechanism;
21. the load-bearing part; 211. the supporting plate; 212, the accommodating groove; 213, the item fixing portion; 214. the connecting plate; 215. the first connecting plate; 216. the second connecting plate; 217. the third connecting plate;
22. The transmission part; 221. the first end; 222. the second end;
3. the reflector; 31, the first side; 32, the second side.

In order to better understand the present disclosure, the following describes the examples of the present disclosure in conjunction with FIG. 1 to FIG. 8.

As shown in FIG. 1, the packaging box provided by one example of the present disclosure includes a housing assembly 1, a lifting mechanism 2, and a reflector 3.

The housing assembly 1 includes a cover body 11 and a seat body 12. The seat body 12 includes a first recessed portion 120 and a second recessed portion 121. The cover body 11 is reversibly connected to the seat body 12 so that it can cover or expose the first recessed portion 120. Optionally, the first recessed portion 120 and the second recessed portion 121 take up the entire space in the seat body 12.

The lifting mechanism 2 includes a load-bearing part 21 and a transmission part 22.

Wherein, the load-bearing part 21 is placed in the first recessed portion 120 and is reversibly connected to the sidewall of the first recessed portion, and the load-bearing part is used to carry items.

Wherein, the transmission part 22 is connected between the cover body 11 and the load-bearing part21 to extend or retract the load-bearing part 21 into the first recessed portion 120 through the overturning of the cover body.

The packaging box has an open state and a closed state. When the packaging box is switched from the closed state to the open state, the overturned cover body 11 drives the load-bearing part 21 through the transmission part 22 to extend out of the first recessed portion 120, that is, extending the base body 12. When the packaging box is switched from the open state to the closed state, the load-bearing part 21 is retracted into the first recessed portion 120. It should be noted that, that the load-bearing part 21 is placed in the first recessed portion 120 means the load-bearing part 21 is connected to the first recessed portion and can be stored in the first recessed portion. It does not mean that the load-bearing part 21 is always located in the first recessed portion.

In some examples, the load-bearing part 21 is connected to the sidewall of the first recessed portion 120 in a reversible manner. For example, the side of the load-bearing part 21 close to the sidewall of the first recessed portion 120 is connected to the sidewall of the first recessed portion and abuts the upper part of the sidewall to form a foldable connection. Or, part of the sidewall of the first recessed portion 120 and the load-bearing part 21 can be integrally formed, and bend at the connection between the two when the supporting member rotates. Or, for example, the load-bearing part 21 can be connected to the sidewall of the first recessed portion 120 via a pinned support to form a foldable connection. Wherein, the pinned support may be a structure in which a receiving hole and a supporting column are matched. One of the sidewalls of the first recessed portion 120 and the load-bearing part 21 is provided with a receiving hole, and the other is provided with a supporting column, and the supporting column is located in the receiving hole and rotatable with respect to the receiving hole.

The reflector 3 is placed in the seat body 12 and forms a virtual hollow space with the second recessed portion 121. It should be noted that the virtual hollow space refers to the visually generated space that the user sees when looking at the second recessed portion 121. It is virtual and not real. The "size" of the virtual hollow space that is perceived by a user is larger than the size of the second recessed portion. Optionally, the virtual hollow space perceived by a user can the entire seat body 12, that is, when the user looks at the second recessed portion 121, they would have the misconception that what he sees is the inside of the entire seat body and thinks the seat body is hollow.

In the packaging box provided by this example of the present disclosure, a transmission part 22 is provided between the load-bearing part 21 and the cover body 11, and the transmission part is used to realize the extension of the load-bearing part 21 with the overturn of the cover body, that is, to realize the raising of the packaged item. By setting the reflector 3, an enlarged virtual hollow space is created. That is to say, when the user looks at the packaging box in its closed state, what the user sees is the virtual hollow space created by the reflector 3 and the second recessed portion 121, thinking that most or all of the packaging box is empty and without any item. When the user opens the cover body 11, the item slowly rises from another space, which is the first recessed portion 120, in a rotational manner, and is displayed in front of the user, which brings the user a novel experience and a desire for exploration. The design of the packaging box makes the process of accessing the item in the box substantially more fun.

Figure 2:
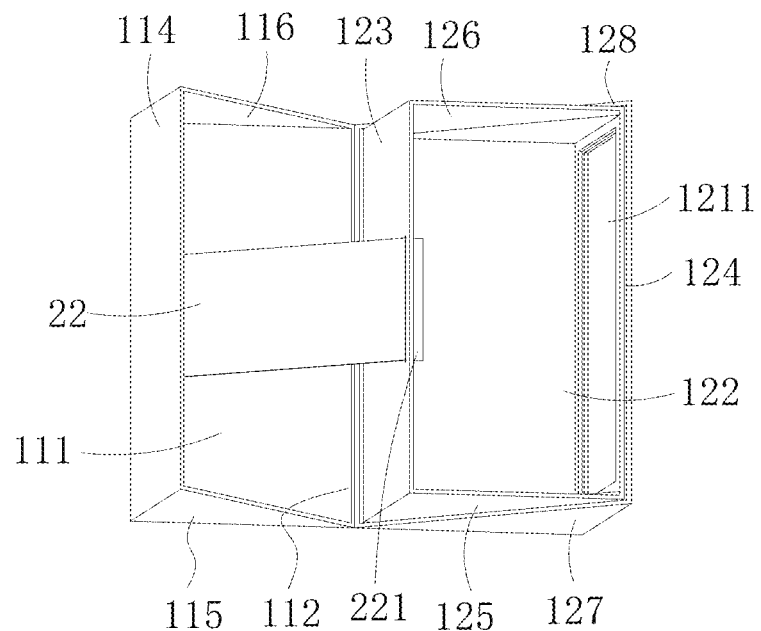
FIG. 2 is a schematic diagram of the structure of the housing assembly and the transmission part in the packaging box shown in FIG. 1.

FIG. 2 is a schematic diagram of the structure of the housing assembly and the transmission part in the packaging box shown in FIG. 1 (not including the load-bearing part or the reflector).

According to FIG. 2, in some examples, the seat body 12 includes a bottom wall 122, a first sidewall 123, a second sidewall 124, a third sidewall 125, and a fourth sidewall 126 placed around the bottom wall 122. Wherein, the first sidewall 123 and the second sidewall 124 are opposite to each other, and the third sidewall 125 and the fourth sidewall 126 are opposite to each other. As shown in FIG. 1, the reflector 3 is used to separate the first recessed portion 120 and the second recessed portion 121. The first recessed portion 120 includes a first opening 1201 facing away from the bottom wall 122, and the load-bearing part 21 passes through the first opening 1201 to extend or retract the first recessed portion. The second sidewall 124 is provided with an observation portion 1211 next to the second recessed portion 121 so that a user can observe the virtual hollow space through the observation portion. The reflector 3 is obliquely placed in the seat body 12 and faces the observation portion 1211 when tilted, also, the included angle formed by the reflector and the bottom wall 122 that faces the observation portion is an acute angle.

Optionally, the observation portion 1211 is a second opening. The size of the second opening is not constrained but needs to meet the requirement that the user can see the entire virtual hollow space clearly through the second opening.

In another example, the observation portion 1211 is a transparent baffle. Therefore, the present disclosure can not only provide a virtual hollow space in the packaging box but also avoid the accumulation of dust in the packaging box. The transparent baffle can be made of glass or plastic.

Optionally, the seat body 12 has a rectangular structure, wherein the first opening 1201 is located on the top surface of the rectangular structure, and the cover body 11 can cover the first opening 1201 to cover the first recessed portion 120.

Optionally, the first recessed portion 120 and the second recessed portion 121 are not connected, that is, the reflector 3 completely separates the first recessed portion 120 and the second recessed portion 121.

In some examples, the reflector 3 is used to divide the space in the seat body 12 into the first recessed portion 120 and the second recessed portion 121, and no other supporting wall is provided to separate the space, which can simplify the structure, save materials, and reduce the weight of the packaging box.

Figure 3:
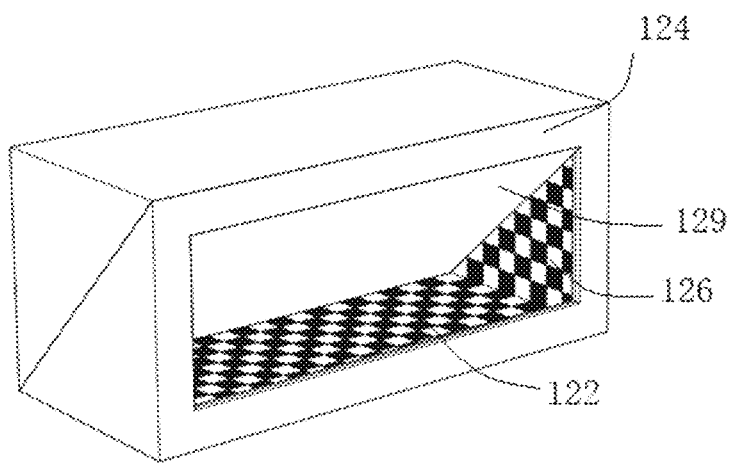
FIG. 3 is a schematic structural diagram of a packaging box in a closed state according to one example of the disclosure, which mainly shows the structure of the packaging box when the reflector is not installed.

FIG. 3 is a schematic structural diagram of a packaging box in a closed state according to an example of the disclosure, which mainly shows the structure of the packaging box when the reflector is not installed.

In other examples, according to FIG. 3, an inclined inner sidewall 129 can also be placed in the seat body 12 to separate the first recessed portion 120 and the second recessed portion 121. Also, the included angle formed by the inner sidewall 129 and the bottom wall 122 that faces the observation portion 1211 is an acute angle. Also, the reflector 3 can be attached to the surface of the inner sidewall 129 that faces the second recessed portion 121.

Figure 4:
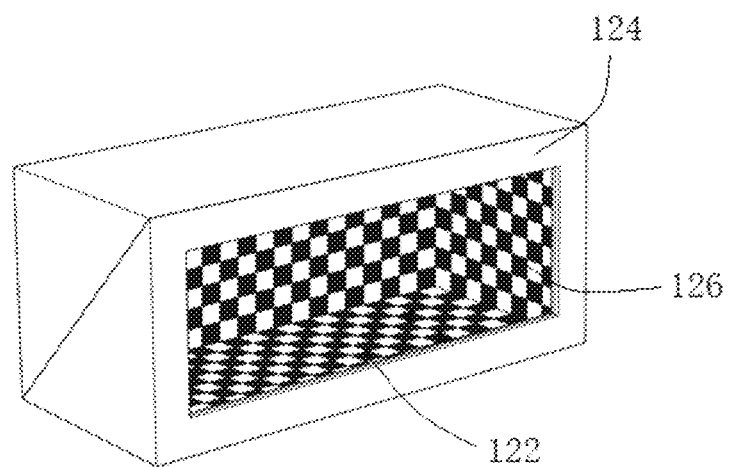
FIG. 4 is a schematic structural diagram of the packaging box in a closed state according to an example of the disclosure, which mainly shows the structure of the packaging box when the reflector forms a virtual hollow space.

FIG. 4 is a schematic structural diagram of a packaging box in a closed state according to an example of this disclosure, which mainly shows the structure of the packaging box when the reflector forms a virtual hollow space.

According to FIG. 4, in some examples, the sidewall of the second recessed portion 121 is provided with a layer that faces the inside of the second recessed portion, and the reflective surface of reflector 3 faces the second recessed portion, which is used to reflect the pattern of the layer. The sidewall of the second recessed portion 121 includes a portion of the third sidewall 125 that faces the second recessed portion 121, a portion of the fourth sidewall 126 that faces the second recessed portion, and a portion of the second sidewall 124 that faces part or all of the second recessed portion and part or all of the bottom wall 122. The aforementioned portions of sidewalls form the second recessed portion 121.

The pattern of the reflective layer is not constrained and is optional. In the example shown in FIG. 4, the pattern of the reflective layer is an array of graphics and text. For example, the pattern may also be grids. It should be noted that the patterns of the bottom wall 122, the third sidewall 125, and the fourth sidewall 126 should match the pattern of the reflective layer.

The reflective surface of the reflector 3 reflects the pattern of the bottom wall 122, the third sidewall 125, and the fourth sidewall 126, thereby forming a virtual hollow space, giving the user a visual illusion that the inside of the packaging box is empty, so when the packaged item arises, the user may feel that the design is novel and fun.

Figure 5:
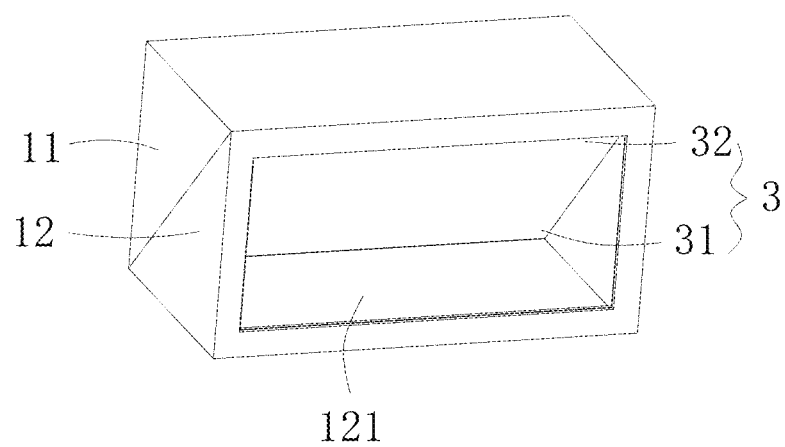
FIG. 5 is a schematic structural diagram of the packaging box in a closed state according to an example of the disclosure.

FIG. 5 is a schematic structural diagram of a packaging box in a closed state according to an example of the present disclosure.

According to FIG. 5, further, the reflector 3 includes a first side 31 and a second side 32 opposite to each other. The first side 31 is connected to the surface of the first sidewall 123 that faces the first recessed portion 120, and the second side 32 is connected to the surface of the second sidewall 124 that faces the second recessed portion 121, and the included angle formed by the reflector 3 and the bottom wall 122 that faces of the second recessed portion is an acute angle.

Optionally, the first side 31 of the reflector 3 is connected to the bottom side of the first sidewall 123, wherein the bottom side is the side where the first sidewall 123 is connected to the bottom wall 122, and the second side 32 of the reflector is connected to the top side of the second sidewall 124 is the side of the second sidewall 124 opposite to the bottom wall 122. At this time, the reflector 3 is placed obliquely between the first sidewall 123 and the second sidewall 124 to partition the space of the seat body 12 into a first recessed portion 120 and a second recessed portion 121.

Further, optionally, the included angle formed by the reflector 3 and the bottom wall 122 that faces the second recessed portion 121 is 45°. The angle between the reflector 3 and the bottom wall 122 is set to 45°. Under the premise that the seat body 12 is in the shape of a cube, the second recessed portion 121 can appear as a hollow cubic space, giving the user a sense of illusion. The included angle between the reflector 3 and the bottom wall 122 can also be of other sizes, as long as the second recessed portion 121 can appear as a three-dimensional virtual hollow space. For example, the included angle between the reflector 3 and the bottom wall 122 may also be 45.1°, etc., which is not particularly limited in this application.

In other examples, the second side 32 of the reflector 3 is connected to the upper part of the second sidewall 124.

In other examples, the first side 31 of the reflector 3 is connected to a portion of the bottom wall 122 that is close to the first sidewall 123.

The exact locations where the reflector 3 and the second sidewall 124 are connected and where the reflector 3 and the bottom wall 122 are connected are not limited in this application, but they should be set so that the virtual hollow space formed by the reflector 3 and the second recessed portion 121 is about the same size or slightly smaller than the volume of the internal space of the seat body 12, which makes the user feel that most of the space in the seat body is empty.

Optionally, the first side 31 of the reflector 3 is connected to the first sidewall 123 or the bottom wall 122, the second side 32 of the reflector 3 is connected to the second sidewall 124, and the other two sides of the reflector 3 respectively abut the third sidewall 125 and the fourth sidewall 126. Further, optionally, the third sidewall 125 and the fourth sidewall 126 are provided with inclined platforms adapted to accommodate the sides of the reflector 3, and the inclined platforms are used to support the two sides of the reflector and limit the reflector's movement.

In other examples, the first sidewall 123, the bottom wall 122, and the second sidewall 124 are all provided with clamping stoppers, and the seat body 12 restricts the reflector 3 in the seat body with the clamping stopper. Optionally, the clamping stoppers are grooves.

Optionally, the reflector 3 is a single-sided mirror. The reflector 3 can also be another sheet-like structure with a reflective surface, and the present disclosure does not intend to make further limitations.

Figure 6:
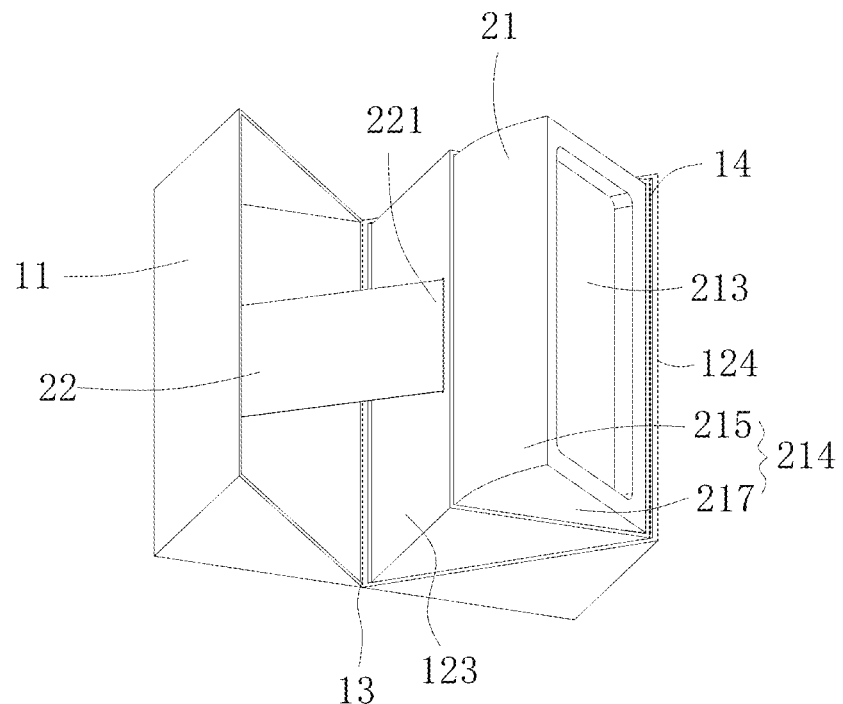
FIG. 6 is a schematic structural diagram of the packaging box in an open state according to one example of the disclosure.

FIG. 6 is a schematic structural diagram of a packaging box in an open state provided in an example of the disclosure.

According to FIG. 6, in some examples, the cover body 11 is reversibly connected to the surface of the first sidewall 123 that faces away from the second sidewall 124 around the first rotational axis 13. The load-bearing part 21 is reversibly connected to the surface of the second sidewall 124 that faces the first sidewall 123 around the second rotational axis 14, wherein the second rotating axis is parallel to the first rotational axis 13. When the load-bearing part 21 rotates around the second sidewall 124 and enters the seat body 12, the cover body 11 rotates around the first sidewall 123 to cover the seat body.

In some examples, an item fixing portion 213 is provided on the end of the load-bearing part 21 that faces away from the first recessed portion 120. The item fixing portion 213 can be at least one selected from the group of a receiving groove, a buckle fixing structure, a magnetic fixing structure, and an adhesive fixing structure.

Optionally, the first rotational axis 13 is the side of the first sidewall 123 that is connected to the bottom wall 122, that is, the bottom side of the first sidewall 123.

In other examples, the first rotational axis 13 may be the top edge of the first sidewall 123. That is, the cover body 11 can be reversibly connected to the top edge of the first sidewall 123 to cover the first recessed portion 120.

Optionally, the second rotational axis 14 is the top edge of the second sidewall 124, and the two rotational axes are parallel. Such an arrangement can make the movement process of the cover 11 and the load-bearing part 21 simpler and smoother. The second rotational axis 14 may also be placed in the upper middle part of the second sidewall 124.

Figure 7:
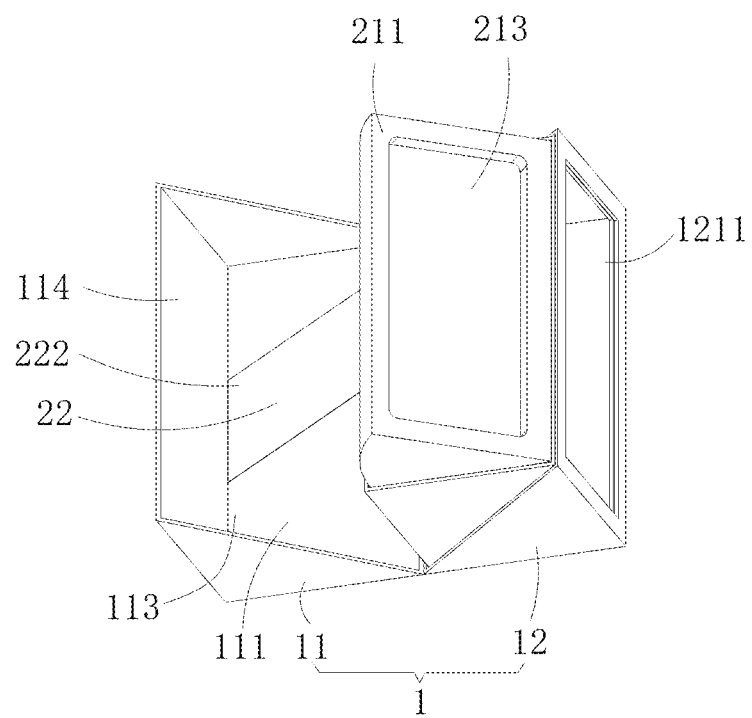
FIG. 7 is a schematic structural diagram of the packaging box as shown in FIG. 6 from a different perspective.

FIG. 7 is a schematic structural diagram of the packaging box shown in FIG. 6 from another perspective.

According to FIG. 7, the transmission part 22 includes a first end 221 and a second end 222. The first end 221 is fixed to the end of the load-bearing part 21 that faces the first recessed portion 120, and the second end 222 is fixed to the side of the cover body 11 that faces the seat body 12.

Specifically, the packaging box has an above-mentioned open state where the first recessed portion 120 is exposed and a closed state where the first recessed portion is covered by the cover 11. In the process of switching the packaging box from the open state to the closed state, the transmission member 22 can always be in a tensioned state and can also be switched between a tensioned state and a relaxed state. The detailed description of the process will be given below under the condition that the transmission part 22 can be switched between the tensioned state and the relaxed state.

When the packaging box is in the closed state, the load-bearing part 21 is located in the first recessed portion 120, the transmission part 22 passes through the first sidewall 123 or crosses the top of the first sidewall 123 and is connected to the cover body 11, and the transmission part 22 is now in the relaxed state. When the packaging box is switched from the closed state to the open state, the cover body 11 rotates around the first rotation axis 13 to pull the transmission part 22, and the transmission part 22 gradually switches from the relaxed state to the tensioned state. After it is completely switched to the tensioned state, the transmission part 22 starts to pull the load-bearing part 21, and the load-bearing part 21 gradually rotates and rises. Whe'n the first end 221 of the transmission part 22 rises to the top of the first sidewall 231, the cover body 11 rotates around the first rotational axis 13 to the extreme position, and the load-bearing part 21 rotates to a position above the first recessed portion 120.

In some examples, the cover body 11 includes a fifth sidewall 111 and a sixth sidewall 114. The fifth sidewall 111 includes a first side edge 112 and a second side edge 113 opposite to each other. The first side edge 112 is connected to the surface of the first sidewall 123 that faces away from the second sidewall 124, the second side edge 113 is connected to the sixth sidewall 114, and the sixth sidewall covers the first recessed portion 120 when the fifth sidewall 111 is turned over to touch the first sidewall.

In some examples, the second end 222 of the transmission part 22 is connected to the second side edge 113 of the fifth sidewall 111. Wherein, the first side edge 112 and is rotatably connected to the first sidewall 123 around the first rotating axis 13.

In another example, the second end 222 of the transmission part 22 is connected to the edge of the sixth sidewall 114 that is opposite to the second side edge 113. Moreover, when the packaging box is in the closed state, the load-bearing part 21 is placed in the first recessed portion 120, and the first end 221 of the transmission part 22 is located in the first recessed portion 120 alongside the load-bearing part 21, and the second end 222, following the movement of the sixth sidewall 114, is aligned with the top edge of the second sidewall 124. During the transition of the packaging box from the closed state to the open state, the second end 222 gradually rises, pulling the load-bearing part 21 to rise, so that the item in the load-bearing part 21 is displayed in front of the user.

Optionally, the packaging box has a rectangular structure, and the included angle between the fifth sidewall 111 and the sixth sidewall 114 is a right angle.

Connecting the transmission part 22 to the second side 113 can not only make the process of processing and manufacturing convenient but also enable the transmission part 22 to be located in the space enclosed by the cover 11 when the packaging box is in an open state, which makes the transmission part not easy to be seen and thus improves the aesthetic quality of the packaging box.

Optionally, the first sidewall 123 is provided with an opening at an end that is away from the bottom wall 122, and the transmission part 22 passes through the opening. The first sidewall 123 is provided with an opening for accommodating the transmission part 22, so that the transmission part 22 moves along the opening, provides guidance for the movement of the transmission part 22, and enhances the aesthetics of the movement process.

Optionally, the transmission part 22 includes at least one selecting from the group of a draw-string, a rope, and a belt. Further, optionally, the draw tape is a 0.04 mm thick frosted PET draw tape.

In some examples, the load-bearing part 21 includes a supporting plate 211 and a connecting plate 214. One side of the supporting plate 211 is connected to the second sidewall 124, and the connecting plate 214 is connected to the side of the supporting plate 211 that faces the first recessed portion 120. The first end 221 of the transmission part 22 is connected to the bottom end of the connecting plate 214. The article fixing part 213 is disposed on the supporting plate 211. Optionally, the supporting plate 211 and the connecting plate 214 are connected at an acute angle. Optionally, the item fixing portion 213 has a groove structure, and the groove structure is used for accommodating the article. The shape of the item fixing portion 213 is not constrained, as long as it can accommodate the article, and the shape of the article fixing portion 213 can also be consistent with the shape of the article to be placed for aesthetic reasons.

A connecting plate 214 is provided on the side of the supporting plate 211 that faces the first recessed portion 120 to connect to the transmission part 22 to the bottom end of the connection plate 214. When the packaging box is in an open state, the connecting plate 214 is driven by the transmission part 22 to rise to the first opening 1201 of the first recessed portion 120, the supporting plate 211 connected to the connecting plate is located above the connecting plat, that is, above the first recessed portion 120, and is presented in front of the user. With the connecting plate 214, the supporting plate 211 is not only supported, but also placed higher than the first recessed portion 120, so that the supporting plate 211 meets the height requirement.

Further, according to FIGS. 1 and 6, the connecting plate 214 includes a first connecting plate 215, a second connecting plate 216, a third connecting plate 217, and a fourth connecting plate. The first connecting plate 215 is connected to the supporting plate 211 and the transmission part 22, the second connecting plate 216 is connected between the first connecting plate 215 and the supporting plate, 211 and the second connecting plate 216 and/or the supporting plate 211 are rotatably connected to the second sidewall 124. The first connecting plate 215, the supporting plate 211, and the second connecting plate 216 form a through hole, and the third connecting plate 217 and the fourth connecting plate are respectively placed at the two openings of the through hole to form a closed structure.

Figure 8:
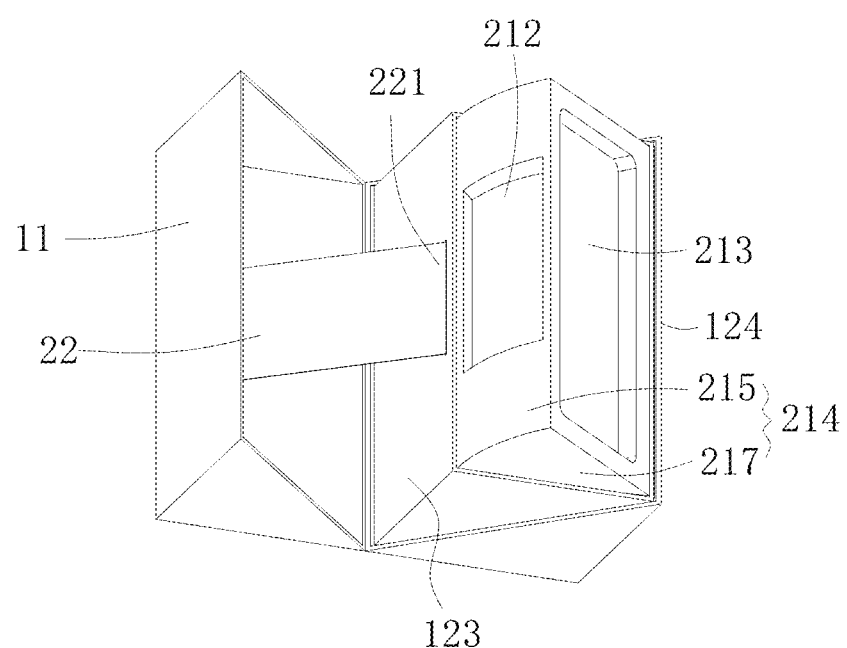
FIG. 8 is a schematic structural diagram of the packaging box in an open state according to another example of the disclosure.

FIG. 8 is a schematic structural diagram of another example of a packaging box in its open state as provided by the present disclosure.

According to FIG. 8., in some examples, an accommodating groove 212 is provided on the connecting plate 214. The opening of the accommodating groove 212 is located outside the connecting plate 214, and the accommodating groove is used for accommodating objects (such as product manuals, gifts, etc.). The accommodating groove 212 may be provided on at least one of the first connecting plate 215, the third connecting plate 217, and the fourth connecting plate. In FIG. 8, the accommodating groove 212 is provided on the first connecting plate 215 for illustration.

In some examples, the depth of the accommodating groove 212 can be adjusted and designed according to the limitations of the structure and the size of the item to be accommodated.

Optionally, the transmission part 22 is connected to the side of the first connecting plate 215 that faces away from the supporting plate 211, that is, the bottom side of the first connecting plate 215. Hence, the supporting plate 211 can be raised to its maximum height. Further, optionally, the first connecting plate 215 is a curved panel, and the panel is curved in a direction away from the supporting plate 211. Making the first connecting plate 215 a curved plate not only creates an aesthetically pleasing appearance but also facilitates its connection with the transmission part 22.

Optionally, the first end 221 of the transmission part 22 is bonded to the first connecting plate 215, and the second end 222 of the transmission part is pressed into the second side edge 113.

Optionally, the supporting plate 211, the first connecting plate 215, the second connecting plate 216, the third connecting plate 217, and the fourth connecting plate may be bent from the same cardboard.

The connecting plate 214 is configured to include a first connecting plate 215, a second connecting plate 216, a third connecting plate 217, and a fourth connecting plate. The first connecting plate 215, the second connecting plate 216, the third connecting plate 217, the fourth connecting plate, and the supporting plate 211 form a strong, enclosed structure, and the transmission part 22 provides support for the item in the item fixing portion 213 through the structure. Moreover, the structure is aesthetically pleasing.

In some examples, according to FIG. 2, the seat body 12 further includes a seventh sidewall 127 and an eighth sidewall 128. The seventh sidewall 127 is attached to the surface of the third sidewall 125 that faces away from the second recessed portion 121. On one side, the eighth sidewall 128 is attached to the surface of the fourth sidewall 126 that faces away from the second recessed portion 121. The cover body 11 includes a ninth sidewall 115 and a tenth sidewall 116. The ninth sidewall 115 and the tenth sidewall 116 are located on both lateral sides of the fifth sidewall 111, and the ninth sidewall 115 and the tenth sidewall 116 are connected between the fifth sidewall 111 and the sixth sidewall 114. When the packaging box is in the closed state, the ninth sidewall 115 abuts the seventh sidewall 127, and the tenth sidewall 116 abuts the eighth sidewall 128.

Further, the seventh sidewall 127, the eighth sidewall 128, the ninth sidewall 115 and the tenth sidewall 116 are all triangular. Optionally, the orthographic projection of the second recessed portion 121 on the seventh sidewall 127 coincides with the seventh sidewall 127, and the orthographic projection of the second recessed portion 121 on the eighth sidewall 128 coincides with the eighth sidewall 128.

The seventh sidewall 127 and the eighth sidewall 128 are provided so that the ninth sidewall 115 and the tenth sidewall 116 of the cover body 11 can abut against the seventh sidewall 127 and the eighth sidewall 128 after being turned over. This design can reduce the area of the ninth sidewall 115 and the tenth sidewall 116, thus greatly reducing the friction between the cover body 11 and the seat body 12 during the turning process, and thus enhancing the smoothness of the cover body's rotational movement.

Optionally, the packaging box includes a ninth sidewall and a tenth sidewall. The ninth sidewall is attached to the side of the third sidewall 125 that is close to the second recessed portion 121, and the second recessed portion 121 is located on the side of the ninth sidewall. The orthographic projection of the second recessed portion 121 on the side of the ninth sidewall coincides with the ninth sidewall, and the ninth sidewall is placed to abut the reflecting surface of the reflector 3 and provide support for the reflector 3. The tenth sidewall is attached to the side of the fourth sidewall 126 that is close to the second recessed portion 121, the orthographic projection of the second recessed portion 121 on the tenth sidewall coincides with the tenth sidewall, and the tenth sidewall is placed to abut the reflecting surface of the reflector 3 and provides support for the reflector 3.

The ninth sidewall and the tenth sidewall abutting on the lateral sides of the reflector 3 are provided to provide support for the reflector, which is strong, reliable, and easy to manufacture.

The present disclosure also provides a method of manufacturing a packaging box. The method includes providing a housing comprising a cover body and a seat body, providing the seat body with a first recessed portion and a second recessed portion, and reversibly connecting the cover body to the seat body, so that the cover body is configured to adjust to cover or expose the first recessed portion; providing a lifting mechanism comprising a load-bearing part and a transmission part; and placing a reflector in the seat body, and forming a hollow space between the reflector and the second recessed portion.

In some examples, the method further includes providing the seat body with a bottom wall, a first sidewall, a second sidewall, a third sidewall, and a fourth sidewall; and placing the first sidewall, the second sidewall, the third sidewall, and fourth sidewall around the bottom wall, wherein the first sidewall and the second sidewall are opposite to each other, and the third sidewall and the fourth sidewall are opposite to each other.

In some example, the method further includes placing the reflector to separate the first recessed portion and the second recessed portion, providing the first recessed portion with a first opening facing away from the bottom wall, and providing the second sidewall with an observation portion next to the second recessed portion, so that the hollow space is configured to be seen through the observation portion by a user.

The present disclosure provides a packaging box. The packaging box includes: a housing that includes a cover body and a seat body, the seat body includes a first recessed portion and a second recessed portion, and cover body is reversibly connected to the seat body to cover or expose the first recessed portion; a lifting mechanism that includes a load-bearing part and a transmission part; and a reflector placed in the seat body and forming a hollow space with the second recessed portion. The load-bearing part is placed in the first recessed portion and is reversibly connected to the sidewall of the first recessed portion, and the load-bearing part is used to carry items The transmission part is connected between the cover body and the load-bearing part, so that the load-bearing part can extend or retract the first recessed portion by turning the cover body over.

In some examples, the seat body includes a bottom wall, a first sidewall, a second sidewall, a third sidewall and a fourth sidewall. Wherein, the first sidewall, the second sidewall, the third sidewall, and fourth sidewall are arranged around the bottom wall. Wherein, the first sidewall and the second sidewall are opposite to each other, and the third sidewall and the fourth sidewall are opposite to each other. Wherein, the reflector is used to separate the first recessed portion and the second recessed portion, the first recessed portion includes a first opening facing away from the bottom wall, and the second sidewall is provided with an observation portion next to the second recessed portion, so that a user can look at the virtual hollow space through the observation portion.

In some examples, the reflector includes a first edge and a second edge opposite to each other. Wherein, the first edge is connected to the surface of the first sidewall that faces the first recessed portion. Wherein, the second edge is connected to the surface of the second sidewall that faces the second recessed portion. Wherein, the included angle formed by the reflector and the bottom wall and facing the second recessed portion is an acute angle.

In some examples, the cover is reversibly connected to the surface of the first sidewall that faces away from the second sidewall around a first rotational axis. Wherein, the load-bearing part is reversibly connected to the surface of the second sidewall that faces the first sidewall around a second rotational axis, and the side of the bear-loading part that faces away from the first recessed portion is provided with an item fixing portion. Wherein, the item fixing portion includes at least one component selected from the group consisting of an accommodating groove, a buckle fixing structure, a magnetic fixing structure, and an adhesive fixing structure. Wherein, the second rotation axis is parallel to the first rotation axis. Wherein, the transmission part includes a first end and a second end opposite to each other, the first end is fixed to a side of the carrier member facing the first recessed portion, and the second end is fixed to the side of the cover body that faces the seat body.

In some examples, the cover includes a fifth sidewall and a sixth sidewall. Wherein, the fifth sidewall includes the first and second side edges that are opposite to each other, the first side edge is connected to the surface of the first sidewall that faces away from the second sidewall, and the second side edge is connected with the sixth sidewall. Wherein, the sixth sidewall covers the first recessed portion when the fifth sidewall is turned over to touch the first sidewall. Wherein, the second end of the transmission part is connected to the second side edge of the fifth sidewall or the edge of the sixth sidewall that is opposite to the second side edge.

In some examples, the load-bearing part includes a supporting plate and a connecting plate, with one side of the supporting plate connected to the second sidewall, and the connecting plate connected to the side of the supporting plate that faces the first recessed portion, and the first end of the transmission part is connected to the bottom end of the connecting plate.

In some examples, the connecting plate includes a first connecting plate, a second connecting plate, a third connecting plate, and a fourth connecting plate. Wherein, the first connecting plate is connected between the supporting plate and the transmission part. Wherein, the second connecting plate is connected between the first connecting plate and the supporting plate, the second connecting plate and/or the supporting plate are rotatably connected to the second sidewall, and the second connecting plate, the supporting plate, and the first connecting board form a through hole. Wherein, the third connecting plate and the fourth connecting plate are respectively placed on the two openings of the through hole to form a closed structure.

In some examples, the connecting plate is provided with a receiving groove, and the opening of the receiving groove is located on the outer surface of the connecting plate. Wherein, the accommodating groove is used for placing objects.

In some examples, the second recessed portion has a sidewall, and the sidewall of the second recessed portion is provided with a layer with patterns, wherein the patterns face the inside of the second recessed portion, and the reflector has a reflective surface, which faces the first recessed portion and is used to reflect the patterns of the layer.

In some examples, the reflector is a single-sided mirror, and/or the transmission part includes at least one member selected from the group consisting of a drawstring, a rope, and a belt.

The packaging box provided by the examples of the present disclosure provides a transmission part between the carrier and the cover and uses a linkage transmission part of the cover body to realize the extension of the load-bearing part, that is, to realize the lifting of the packaged item. With the reflector, the packaging box can create a vast virtual hollow space. In other words, if the user sees the packaging box when it is closed, what the user sees is the virtual hollow space created by the reflector, which tricks the user into thinking that most or all of the packaging box is empty, without any items. After opening the cover, the items are slowly rotated and displayed in front of the user from another space, that is, the first recessed portion, which brings the user a novel experience and a desire to explore, which makes the process of accessing the item substantially more interesting.

Other examples of the present disclosure will be apparent to those skilled in the art from consideration of the specification and practice of the present disclosed. This disclosure is intended to cover any variations, uses, or adaptations of the disclosure such departures from the present disclosure as come within known or customary practice in the art. It is intended that the specification and examples be considered as exemplary only, with a true scope and spirit of the present disclosure being indicated by the following claims.

It will be appreciated that that the present disclosure is not limited to the exact construction that has been described above and illustrated in the accompanying drawings, and that various modifications and changes may be made without departing from the scope thereof. It is intended that the scope of the present disclosure only by the appended claims.

The invention claimed is:

1. A packaging box, comprising:
a housing comprising a cover body and a seat body, wherein the seat body further comprises a first recessed portion and a second recessed portion, and the cover body is configured to adjust to cover or expose the first recessed portion by reversibly connecting to the seat body;
a lifting mechanism comprising a load-bearing part and a transmission part; and
a reflector disposed in the seat body and forming a hollow space with the second recessed portion;
wherein the load-bearing part is disposed in the first recessed portion, the load-bearing part is reversibly connected to a sidewall of the first recessed portion, and the load-bearing part is configured to carry items;
wherein the transmission part is connected between the cover body and the load-bearing part, so that the load-bearing part is configured to extend or retract the first recessed portion by overturning the cover body; and
wherein the seat body comprises a bottom wall, a first sidewall, and a second sidewall, the first sidewall and the second sidewall are placed around the bottom wall, the first sidewall and the second sidewall are opposite to each other, the reflector is configured to separate the first recessed portion and the second recessed portion, the first recessed portion comprises a first opening facing away from the bottom wall, and the second sidewall comprises an observation portion next to the second recessed portion, so that the hollow space is configured to be seen through the observation portion by a user.

2. The packaging box of claim 1, wherein the seat body further comprises a third side wall and a fourth sidewall;
wherein the third sidewall and fourth sidewall are placed around the bottom wall
wherein the third sidewall and the fourth sidewall are opposite to each other.

3. The packaging box of claim 2, wherein the reflector comprises a first edge and a second edge opposite to each other;
wherein the first edge is connected to a surface of the first sidewall, and the surface of the first sidewall faces the first recessed portion;
wherein the second edge is connected to a surface of the second sidewall, and the surface of the second sidewall faces the second recessed portion; and
wherein an angle formed by, the reflector and the bottom wall that faces the second recessed portion is an acute angle.

4. The packaging box of claim 2, wherein the cover body is reversibly connected to a surface of the first sidewall that faces away from the second sidewall around a first rotational axis;
wherein the load-bearing part is reversibly connected to a surface of the second sidewall that faces the first sidewall around a second rotational axis, and a side of the load-bearing part that faces away from the first recessed portion comprises an item fixing portion;
wherein the item fixing portion comprises at least one of an accommodating groove, a buckle fixing structure, a magnetic fixing structure, or an adhesive fixing structure;
wherein the second rotational axis is parallel to the first rotational axis; and
wherein the transmission part comprises a first end and a second end that are opposite to each other, the first end is fixed to a side of the load-bearing part that faces the first recessed portion, and the second end is fixed to a side of the cover body that faces the seat body.

5. The packaging box of claim 4, wherein the cover body comprises a fifth sidewall and a sixth sidewall;
wherein the fifth sidewall comprises a first side edge and a second side edge that are opposite to each other, the first side edge is connected to the surface of the first sidewall that faces away from the second sidewall and the second side edge is connected with the sixth sidewall;
wherein the sixth sidewall covers the first recessed portion when the fifth sidewall is turned over to touch the first sidewalk; and wherein the second end of the transmission part is connected to the second side edge of the fifth sidewall or the side edge of the sixth sidewall that is opposite to the second side edge.

6. The packaging box of claim 4, Wherein the load-hearing part comprises a supporting plate and a connecting plate, with one side of the supporting plate connected to the second sidewall, and the connecting plate connected to a side of the supporting plate that faces the first recessed portion, and the first end of the transmission part is connected to a bottom end of the connecting plate.

7. The packaging box of claim 6, wherein the connecting plate comprises a first connecting plate, a second connecting plate, a third connecting plate, and a fourth connecting plate;
wherein the first connecting plate is connected between the supporting plate and the transmission part;
wherein the second connecting plate is connected between the first connecting plate and the supporting plate, the second connecting plate and/or the supporting plate are rotatably connected to the second sidewall, and the second connecting plate, the supporting plate, and the first connecting board form a through hole; and
wherein the third connecting plate and the fourth connecting plate are respectively placed at the two openings of the through hole to form an enclosed structure.

8. The packaging box of claim 6, wherein the connecting plate comprises an accommodating groove, and an opening of the accommodating groove is located on an outer surface of the connecting plate; and
wherein the accommodating groove is configured to accommodate objects.

9. The packaging box of claim 2, wherein the second recessed portion comprises a sidewall, and the sidewall of the second recessed portion comprises a layer with patterns, where the patterns face inside of the second recessed portion, and the reflector has a reflective surface, the reflective surface faces the second recessed portion and is configured to reflect the patterns of the layer.

10. The packaging box of claim 1, wherein the reflector comprises a single-sided mirror.

11. The packaging box of claim 1, wherein the transmission part comprises at least one of a drawstring, a rope, or a belt.

* * * * *